July 8, 1958 G. A. DICKINSON ET AL 2,842,464
METHOD OF PRODUCING AN ELECTRICAL RESISTANCE ON GLASS
Filed March 2, 1954
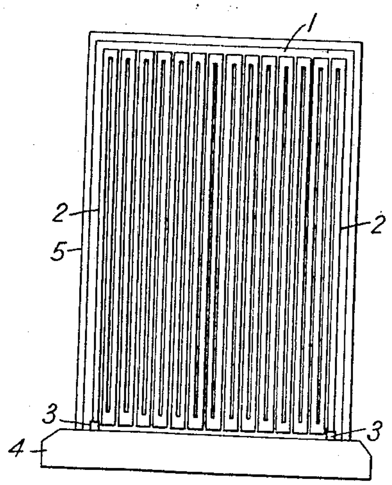
Inventors
G. E. Dickinson
P. E. Fay
By
Morrison, Kennedy & Campbell
Attorneys 2,842,464

METHOD OF PRODUCING AN ELECTRICAL RESISTANCE ON GLASS

George A. Dickinson, Eccleston Hill, St. Helens, and Solomon E. Kay, Windle, St. Helens, England, assignors to Societe Anonyme des Manufactures des Glaces et Produits Chimiques de Saint-Gobain, Chauny & Cirey, Paris, France, a company of France Application March 2, 1954, Serial No. 413,654

Claims priority, application Great Britain March 2, 1953

2 Claims. (Cl. 117—211)

This invention relates to the manufacture of electrical resistances for domestic heating.

Electrical radiators for domestic heating have already been proposed in which the resistance metal is sprayed on to toughened plate glass by means of a gun which projects the metal in a molten state on to the face of the glass, the gun being manipulated so as to produce the desired pattern for the resistance. Such a process is described in United Kingdom Patent No. 455,152.

When the metal is sprayed on, the edge of the pattern is necessarily not clearly defined, and metal arrives on the glass in areas outside the intended defined area, which random particles must be removed to avoid electrical leakage across the glass.

A main object of the present invention is to produce an electrical resistance of the kind referred to in which a clearly defined pattern is produced without random particles, so that the pattern may cover more of the glass than has been heretofore found possible, and accordingly a greater heating area on a sheet of toughened plate glass is obtained.

The invention is particularly suitable for the production of an electrical resistance on toughened plate glass.

In the finished article, the resistance is fully exposed so that full advantage of the heat directly radiated from the resistance is obtained.

A method of producing an electrical resistance on the surface of toughened glass in accordance with the present invention consists in applying resistance metal to the whole of the surface on which the resistance is to be produced with the resistance metal in molten form, covering the metal with a resist to produce on the metal the desired pattern for the resistance, chemically removing the exposed metal by subjecting the exposed parts to a chemical which removes the metal but which has no action on the resist, and then removing the resist, and is characterized in that the resistance metal is selected from the group consisting of aluminium and an aluminium alloy and has a fusing temperature higher than that of the glass, said metal being applied to the plate glass in molten form to fuse the surface of the glass and to form a uniform coating thereon which is self-bonded to the glass, and the removal of exposed metal is effected by a hydrochloric acid solution containing a salt of a metal which is lower in the electromotive force series of elements than aluminium. Preferably the resist is applied to the deposited metal through a silkscreen formed to produce the desired pattern for the resistance.

If the aluminium alloy known as "Mangalium" is the resistance metal, a suitable acid solvent is commercial hydrochloric acid which may be slightly warmed.

By such method of production the edges of the resistance are sharply defined, and no random particles occur outside the area of the pattern of the resistance. Moreover, as the pattern is obtained by painting through a silk screen much greater rapidity of production obtains as compared with a process in which the pattern of the resistance is produced by manipulating a spray gun.

Preferably a resist of a bituminous paint is used to cover a sprayed on coating of aluminium.

In order that the invention may be more clearly understood, a preferred embodiment thereof will now be described, by way of example, with reference to the accompanying diagrammatical drawing, which shows a radiator element produced according to the invention viewed from the front.

In the drawing a sheet of toughened plate glass is shown at 1. The whole of the surface of the glass on which the resistance is to be produced is coated with a resistance metal, the deposited metal covered with a resist in the desired pattern to form coated and uncoated portions of metal, and the uncoated metal again removed from the insulating surface 1, leaving on the latter an "in and out" deposit of resistance metal, as at 2.

The resistance metal may be aluminium or aluminium alloy, for example the alloy known as "Mangalium."

The solvent of the uncoated metal in accordance with the invention is a hydrochloric acid solution which contains a salt of a metal which is lower in the electromotive force series of elements than aluminium, the said salt saving the effect of hastening solution owing to the metallic aluminium displacing the metal of the added salt, the displaced metal setting up an electric couple with the aluminium and inducing local corrosion of the aluminium. A copper salt, for example, copper sulphate ($CuSO_4$) is preferred for this purpose and it may be employed in amount of about five percent of the acid solution.

By the present invention, a greater area of the toughened glass can be effectively covered by the resistance metal than previously possible when the metal was sprayed on e. g. as in United Kingdom Patent No. 455,152 because of the sharply defined edge of the pattern of the resistance and the absence of random metal particles which permits a closing up of the pattern not possible by the spraying methods; hence the method of producing an electrical resistance on plate glass in accordance with the invention produces a higher wattage per unit area than has heretofore been obtained in manufacturing electrical resistances by depositing metal in a predetermined pattern on plate glass.

By the present invention, not only can the resistance follow a ribbon pattern as has already been proposed, for example, as is described in United Kingdom Patent No. 455,152 but any ornamental pattern, for example, regimental crests can be produced, provided, of course, there is an "in and out" path on the pattern for the passage of electrical current. Having produced the desired pattern of the electrical resistance metal, contact terminal pads 3 may be sprayed on at appropriate positions, and these pads may be produced either before or after the chemical treatment of the coated metal. Electrical leads (not shown) are then soldered to the terminal pads 3.

The toughened plate glass carrying the resistance is eventually carried on a base 4 providing support for two parallel sheets of plate glass, one of which carries the resistance element which is disposed inwards of the arrangement. The frame 5 may completely surround the edges of the plate glass and be perforated at the top for the emission of heat. Conveniently, the frame may be formed from sheet metal or a moulded frame may be employed, for example, a frame made from a thermosetting plastic material which has a good electrical insulation. However, a metal frame is preferred as it is more able to stand up to percussion, bearing in mind that the radiator may be of portable nature.

A heater constructed according to the present invention may have a sectionalised resistance element in which contact pads are appropriately placed so that a part only of the resistance is brought into circuit under control of a switch, as will be well-understood by those versed in the art.

The present invention permits electrical resistances of the kind described to be easily and economically produced.

We claim:

1. The method of producing an electrical resistance on the surface of toughened plate glass, which consists of applying resistance metal to the whole of the surface on which the resistance is to be produced, covering the metal with a resist to produce on the metal the desired pattern for the resistance, chemically removing the exposed metal by subjecting the exposed parts to a chemical which removes the metal but which has no action on the resist, characterised in that the resistance metal is selected from the group consisting of aluminium and an aluminium alloy and has a fusing temperature higher than that of the glass, said metal being applied to the plate glass in molten form to fuse the surface of the glass and to form a uniform coating thereon which is self-bonded to the glass, and the removal of exposed metal is effected by a hydrochloric acid solution containing a salt of a metal which is lower in the electromotive force series of elements than aluminium.

2. The method of producing an electrical resistance on the surface of toughened plate glass, which consists of applying resistance metal to the whole of the surface on which the resistance is to be produced, covering the metal with a resist to produce on the metal the desired pattern for the resistance, chemically removing the exposed metal by subjecting the exposed parts to a chemical which removes the metal but which has no action on the resist, characterised in that the resistance metal is selected from the group consisting of aluminium and an aluminium alloy and has a fusing temperature higher than that of the glass, said metal being applied to the glass in molten form to fuse the surface of the glass and to form a uniform coating thereon which is self-bonded to the glass, and that the removal of exposed metal is effected by a hydrochloric acid solution containing copper sulphate ($CuSO_4$) in an amount being about five percent of the acid solution.

References Cited in the file of this patent

UNITED STATES PATENTS

| | | |
|---|---|---|
| 1,303,404 | Simon | May 13, 1919 |
| 2,441,960 | Eisler | May 25, 1948 |
| 2,651,871 | Lynden | Sept. 15, 1953 |

FOREIGN PATENTS

| | | |
|---|---|---|
| 461,275 | Great Britain | Feb. 15, 1937 |

OTHER REFERENCES

Printed Circuit Techniques, Nat. Bureau of Standards Circular 468, November 1947, pages 10–11, 12, 14, 15.